(12) United States Patent
Jeong et al.

(10) Patent No.: US 12,021,961 B2
(45) Date of Patent: Jun. 25, 2024

(54) SEMICONDUCTOR DEVICE TESTING AND CLOCK RECOVERY

(71) Applicant: SAMSUNG ELECTRONICS CO., LTD., Suwon-si (KR)

(72) Inventors: Shinki Jeong, Hwaseong-si (KR); Junyeon Won, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 72 days.

(21) Appl. No.: 18/046,171

(22) Filed: Oct. 13, 2022

(65) Prior Publication Data

US 2023/0122612 A1   Apr. 20, 2023

(30) Foreign Application Priority Data

Oct. 14, 2021 (KR) .......................... 10-2021-0136899

(51) Int. Cl.
H04L 7/00         (2006.01)
(52) U.S. Cl.
CPC .................................. *H04L 7/0062* (2013.01)
(58) Field of Classification Search
CPC .......... H04B 1/0475; H04B 2001/1072; H04B 17/0085; H04W 24/08; H04L 7/0062; H04L 1/24; H04L 1/20
USPC .................................................. 375/355, 335
See application file for complete search history.

(56) References Cited

U.S. PATENT DOCUMENTS

| 7,127,022 | B1 | 10/2006 | Dieguez |
| 9,166,611 | B2 | 10/2015 | Luu |
| 9,735,950 | B1 | 8/2017 | Liu et al. |
| 10,033,519 | B2 | 7/2018 | Duan et al. |
| 10,284,360 | B2 | 5/2019 | Choi et al. |
| 10,313,629 | B2 | 6/2019 | Michihata |
| 10,542,312 | B1 | 1/2020 | Bassett et al. |
| 10,693,568 | B2 | 6/2020 | Rajadurai et al. |
| 2005/0238129 | A1* | 10/2005 | Ishida ..................... H04L 7/044 |
| 2010/0220828 | A1* | 9/2010 | Fuller ................ H03F 3/45179 375/355 |
| 2019/0288831 | A1* | 9/2019 | Kobayashi ............ H04L 7/0334 |

FOREIGN PATENT DOCUMENTS

| JP | 2017-55208 | 3/2017 |
| JP | 6332701 | 5/2018 |

\* cited by examiner

*Primary Examiner* — Khai Tran
(74) *Attorney, Agent, or Firm* — F. CHAU & ASSOCIATES, LLC (57) ABSTRACT

A test device includes a comparison circuit configured to receive a plurality of input signals and generate a plurality of comparison signals based on the plurality of input signals; and a field programmable gate array (FPGA) configured to recover clock data, based on the plurality of comparison signals, wherein the FPGA includes a sampling circuit configured to generate a plurality of sample data signals by sampling the plurality of comparison signals; an edge extraction circuit configured to generate a plurality of edge data signals, based on logic values of bits in the plurality of sample data signals; an edge combining circuit configured to generate combined edge data by performing a logic operation on the plurality of edge data signals; and a filter circuit configured to recover the clock data by filtering the combined edge data.

20 Claims, 7 Drawing Sheets

| | 1st | 2nd | 3rd | 4th | 5th | 6th | 7th | 8th | 9th |
|---|---|---|---|---|---|---|---|---|---|
| SAM_12 | 1 | 1 | 1 | 1 | 1 | 1 | 1 | 1 | 1 |
| SAM_23 | 0 | 0 | 0 | 0 | 1 | 1 | 1 | 1 | 1 |
| SAM_31 | 0 | 1 | 1 | 1 | 1 | 1 | 1 | 1 | 1 |

FIG. 4

| | 1st | 2nd | 3rd | 4th | 5th | 6th | 7th | 8th | 9th |
|---|---|---|---|---|---|---|---|---|---|
| EDGE_12 | 1 | 0 | 0 | 0 | 0 | 0 | 0 | 0 | 0 |
| EDGE_23 | 0 | 0 | 0 | 0 | 1 | 0 | 0 | 0 | 0 |
| EDGE_31 | 0 | 1 | 0 | 0 | 0 | 0 | 0 | 0 | 0 |

| COMBINED EDGE DATA | TEMPORARY CLOCK DATA |
|---|---|
| 10001 | 11111 |
| 10010 | 11110 |
| 10011 | 11111 |
| 10100 | 11100 |
| 10101 | 11111 |
| 10110 | 11110 |
| 10111 | 11111 |
| 11001 | 11111 |
| 11010 | 11110 |
| 11011 | 11111 |
| 11101 | 11111 |
| OTHERS | AS IS |

SEMICONDUCTOR DEVICE TESTING AND CLOCK RECOVERY

CROSS-REFERENCE TO RELATED APPLICATION

This application is based on and claims priority under 35 U.S.C. § 119 to Korean Patent Application No. 10-2021-0136899, filed on Oct. 14, 2021, in the Korean Intellectual Property Office, the disclosure of which is incorporated by reference herein in its entirety.

TECHNICAL FIELD

This disclosure relates generally to semiconductor device testing and recovery of a clock signal generated within a semiconductor device.

Discussion of Related Art

With the rapid development of the electronics industry and user preferences, electronic equipment has become compact and highly functionalized with a high capacity. Accordingly, the test of semiconductor devices included in electronic equipment has also become complex.

A test device testing a semiconductor device may base the test on one or more signals output from the semiconductor device. To accurately receive a signal output from a semiconductor device, a test device should obtain clock data used for the operation of the semiconductor device. Accordingly, an approach for efficiently obtaining clock data used for the operation of a semiconductor device is desirable.

SUMMARY

Embodiments of the inventive concept provide a test device recovering clock data, based on a plurality of input signals received from a semiconductor device.

According to an aspect of the inventive concept, a test device includes a comparison circuit configured to receive a plurality of input signals and generate a plurality of comparison signals based on the plurality of input signals; and a field programmable gate array (FPGA) configured to recover clock data, based on the plurality of comparison signals. The FPGA may include a sampling circuit configured to generate a plurality of sample data signals by sampling the plurality of comparison signals; an edge extraction circuit configured to generate a plurality of edge data signals, based on logic values of bits in the plurality of sample data signals; an edge combining circuit configured to generate combined edge data by performing a logic operation on the plurality of edge data signals; and a filter circuit configured to recover the clock data by filtering the combined edge data. The input signals may include symbol sequences that collectively represent at least clock data.

According to another aspect of the inventive concept, there is provided an operating method of a test device. The operating method includes generating a plurality of comparison signals, based on a plurality of input signals, through a comparison circuit; generating a plurality of sample data signals by sampling the plurality of comparison signals, through a sampling circuit; generating a plurality of edge data signals, based on logic values of bits in the plurality of sample data signals, through an edge extraction circuit; generating combined edge data by performing a logic operation on the plurality of edge data signals, through an edge combining circuit; and recovering clock data by filtering the combined edge data, through a filter circuit.

According to a further aspect of the inventive concept, there is provided a semiconductor device test system including a semiconductor device generating a plurality of input signals; and a test device configured to receive the plurality of input signals and recover clock data based on the plurality of input signals, wherein the test device includes a comparison circuit configured to generate a plurality of comparison signals based on the plurality of input signals; a sampling circuit configured to generate a plurality of sample data signals by sampling the plurality of comparison signals; an edge extraction circuit configured to generate a plurality of edge data signals, based on logic values of bits in the plurality of sample data signals; an edge combining circuit configured to generate combined edge data by performing a logic operation on the plurality of edge data signals; and a filter circuit configured to recover the clock data by filtering the combined edge data.

In another aspect, a data communication device includes: a comparison circuit configured to receive input signals from a semiconductor device and generate comparison signals based on the input signals, where the input signals include symbol sequences that collectively represent clock data and a set of multi-bit data; and clock recovery circuitry. The clock recovery circuitry includes: a sampling circuit configured to generate sample data signals by sampling respective ones of the comparison signals; an edge extraction circuit configured to generate edge data signals, based on logic values of bits in the sample data signals; an edge combining circuit configured to generate combined edge data by performing a logic operation on the edge data signals; and a filter circuit configured to recover the clock data by filtering the combined edge data.

BRIEF DESCRIPTION OF THE DRAWINGS

Embodiments of the inventive concept will be more clearly understood from the following detailed description taken in conjunction with the accompanying drawings in which.

DETAILED DESCRIPTION OF EMBODIMENTS

Hereinafter, embodiments will be described in detail with reference to the accompanying drawings.

Herein, an "edge" in a data signal is a transition between logic levels, e.g., from a logic "1" to a logic "0", or vice versa.

For brevity in the following description, when an element is introduced with a name and a label, the element may subsequently be referred to using just the label or an abbreviated form of the name followed by the label. For instance, "first comparison signal COM_12" may be later referred to as just "COM_12" or "signal COM_12".

Figure 1:
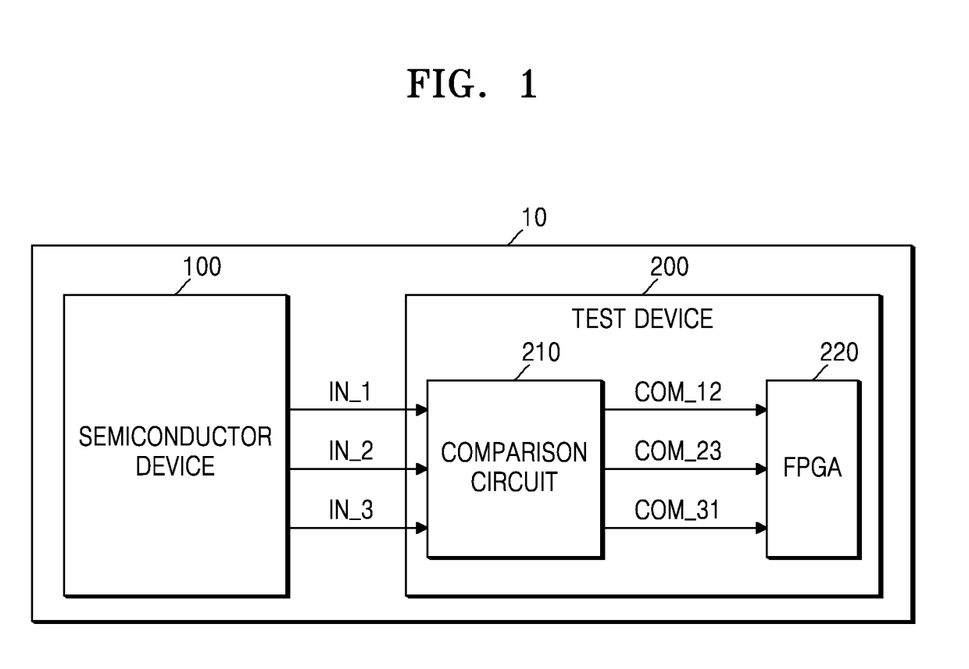
FIG. 1 is a diagram of a semiconductor device test system according to an embodiment.

FIG. 1 is a diagram of a semiconductor device test system 10 according to an embodiment. The semiconductor device test system 10 may include a semiconductor device 100 and a test device 200.

Some examples of semiconductor device 100 include a complementary metal-oxide-semiconductor (CMOS) image sensor (CIS), a system large scale integration (LSI), flash memory, dynamic random-access memory (DRAM), static RAM (SRAM), electrically erasable programmable read-only memory (EEPROM), phase-change RAM (PRAM), or magnetoresistive RAM (MRAM).

The semiconductor device 100 may perform a test operation and generate a plurality of input signals, e.g., first to third input signals IN_1, IN_2, and IN_3, through the test operation. The input signals may be input to the test device 200.

The input signals may be generated based on clock data. Accordingly, the input signals may include information about clock data. Therefore, the test device 200 described below may recover the clock data, based on the input signals. For instance, the input signals may each include a symbol sequence, and the symbol sequences of all the input signals may collectively represent at least clock data. In some embodiments, the symbol sequences of all the input signals collectively represent both clock data and original data, where the clock data and the original data may be encoded. For example, the input signals may be compliant with the MIPI C-PHY protocol, which utilizes a three-wire bus (thereby supporting higher data throughput as compared to a two-wire bus). In an embodiment compliant with the MIPI C-PHY protocol, a 16-bit original data sequence and clock data may be encoded using seven symbols, which are transmitted as part of the input signals IN_1, IN_2 and IN_3 on the three-wire bus. In other examples, a bus with four or more wires, and four or more input signals, are employed to represent clock data and an n-bit original data sequence, where n>16.

The test device 200 may test whether the semiconductor device 100 operates normally, based on a signal received from the semiconductor device 100.

The test device 200 may receive the input signals. The test device 200 may recover clock data used for the operation of the semiconductor device 100, based on the input signals.

The test device 200 may include a comparison circuit 210 and a field programmable gate array (FPGA) 220.

The comparison circuit 210 may receive the input signals. The comparison circuit 210 may generate a plurality of comparison signals, based on the input signals.

In an embodiment, the input signals may include three input signals, i.e., the first input signal IN_1, the second input signal IN_2, and the third input signal IN_3. The comparison circuit 210 may compare the first input signal IN_1 with the second input signal IN_2 and generate a first comparison signal COM_12. The comparison circuit 210 may compare the second input signal IN_2 with the third input signal IN_3 and generate a second comparison signal COM_23. The comparison circuit 210 may compare the third input signal IN_3 with the first input signal IN_1 and generate a third comparison signal COM_31.

Hereinafter, the test device 200 is described focusing on an embodiment, in which a plurality of input signals include three input signals, i.e., the first input signal IN_1, the second input signal IN_2, and the third input signal IN_3. However, in other embodiments, four or more input signals are provided.

The first comparison signal COM_12, the second comparison signal COM_23, and the third comparison signal COM_31 may be input to the FPGA 220.

The FPGA 220 may recover clock data, based on the first to third comparison signals COM_12, COM_23, and COM_31.

In detail, the FPGA 220 may generate a plurality of sample data signals by sampling the first to third comparison signals COM_12, COM_23, and COM_31, respectively. The FPGA 220 may generate a plurality of edge data signals each indicating a position, at which a logic value of each of the sample data signals is changed. The FPGA 220 may generate combined edge data by combining the edge data signals with each other and recover clock data based on the combined edge data.

In other embodiments, the system 10 is a data communication system between the semiconductor device 100 and a data communication device, which may be a data transmitting and receiving device or just a data reception device. The data communication device in these embodiments replaces test device 200 (thus the legend 200 in the figures herein may be understood as a data communication device in these embodiments). The data communication device may operate in the same manner as the test device 200 described herein to recover a clock from the input signals IN_1, IN_2 and IN_3, where the recovered clock may be used to accurately receive data ("recover original data") that may also be represented by the input signals IN_1, IN_2 and IN_3. In the data communication device, the use of an FPGA is advantageous, but clock recovery circuitry of a type differing from an FPGA may be substituted.

Hereafter, the system 10 will be exemplified as a test system employing a test device 200 and an FPGA 220.

The detailed structures and operations of the comparison circuit 210 and the FPGA 220 are described with reference to FIG. 2.

As described above, the test device 200 may recover clock data using the FPGA 220. Accordingly, compared to the case where a semiconductor device, such as an application-specific integrated circuit (ASIC), customized for a particular use is used, the test device 200 may recover clock data at low cost with a short development time. Compared to a circuit recovering clock data using only conventional circuitry (e.g., with commercially available parts), the test device 200 may efficiently recover clock data using a small area and low power.

Figure 2:
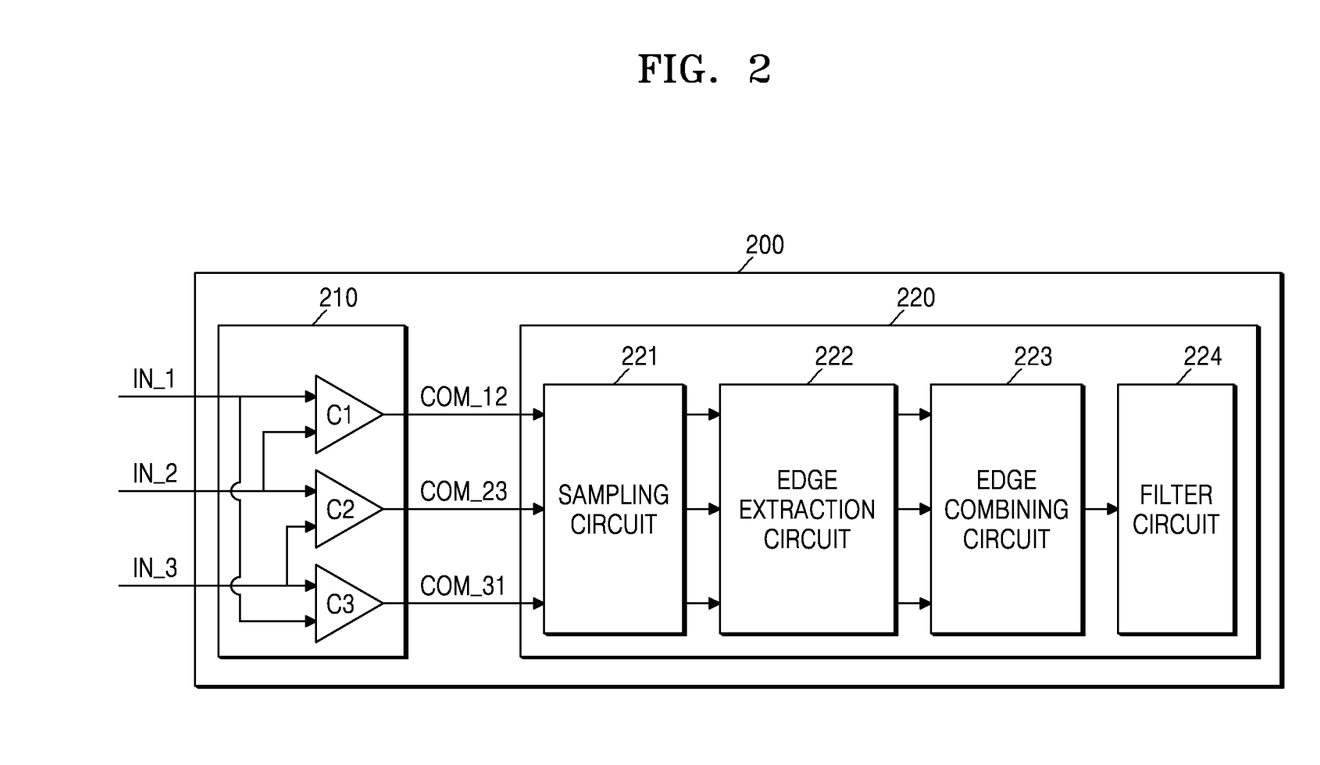
FIG. 2 is a detailed diagram of a test device according to an embodiment.

FIG. 2 is a detailed diagram of the test device 200 according to an embodiment.

Referring to FIG. 2, the test device 200 may include the comparison circuit 210 and the FPGA 220.

The comparison circuit 210 may include a plurality of comparators, e.g., first to third comparators C1, C2, and C3, each comparing two of the first to third input signals IN_1, IN_2, and IN_3 with each other and generating one of the first to third comparison signals COM_12, COM_23, and COM_31.

Each of the comparators may receive two different input signals among the first to third input signals IN_1, IN_2, and IN_3. Each of the comparators may compare the two different input signals among the first to third input signals IN_1, IN_2, and IN_3 with each other and generate one of the first to third comparison signals COM_12, COM_23, and COM_31.

The number of comparators may vary with the number of input signals. When the number of input signals is "n" (where "n" is a natural number of at least 3), the number of comparators may also be n.

For example, when the number of input signals is three, the number of comparators may also be three.

In an embodiment, the comparators may include the first comparator C1, the second comparator C2, and the third comparator C3.

The first comparator C1 may receive the first input signal IN_1 and the second input signal IN_2. The first comparator C1 may compare the first input signal IN_1 with the second input signal IN_2 and generate the first comparison signal COM_12.

For example, the first comparator C1 may generate and output the first comparison signal COM_12 having a first value when the first input signal IN_1 equals or exceeds the second input signal IN_2 and generate and output the first comparison signal COM_12 having a second value when the second input signal IN_2 exceeds the first input signal IN_1.

In an embodiment, the first value may correspond to logic 1 (hereafter, just "1"), and the second value may correspond to logic 0 (hereafter, "0"). In the following examples, "1" will be used as an example of the first value and "0" will be used as an example of the second value. However, the description equally applies to embodiments in which "0" is an example of the first value and "1" is an example of the second value.

The second comparator C2 may receive the second input signal IN_2 and the third input signal IN_3. The second comparator C2 may compare IN_2 with IN_3 and generate the second comparison signal COM_23.

For example, the second comparator C2 may generate and output COM_23 having "1" when IN_2 is equals or exceeds IN_3 and generate and output COM_23 having "0" when IN_3 is greater than IN_2.

The third comparator C3 may receive IN_3 and IN_1, compare IN_3 with IN_1 and generate the third comparison signal COM_31 based on the comparison.

For example, the third comparator C3 may generate and output COM_31 having "1" when IN_3 equals or exceeds IN_1 and having "0" when IN_1 exceeds IN_3.

The first to third comparison signals COM_12, COM_23, and COM_31 may be output from the comparison circuit 210 (e.g., from the first to third comparators C1, C2 and C3, respectively) and directly input to the FPGA 220. The FPGA 220 may directly receive signals COM_12, COM_23, and COM_31 and recover clock data based on these signals.

The FPGA 220 may include a sampling circuit 221, an edge extraction circuit 222, an edge combining circuit 223, and a filter circuit 224.

The sampling circuit 221 may sample the first to third comparison signals COM_12, COM_23, and COM_31, which may be analog signals, and generate, from the analog signals, a respective plurality of sample data sequences (interchangeably, "sample data signals").

The sampling circuit 221 may generate the sample data signals by sampling the first to third comparison signals COM_12, COM_23, and COM_31 at a higher speed than a communication speed of the first to third input signals IN_1, IN_2, and IN_3. In other words, the sampling circuit 221 may generate the sample data signals by performing sampling at a higher speed than the communication between the semiconductor device 100 and the test device 200. For example, when the speed of communication between the semiconductor device 100 and the test device 200 is 3 Gsps, the sampling speed may be 28.3 Gsps.

The edge extraction circuit 222 may generate a plurality of edge data sequences (interchangeably, "edge data signals"), based on logic values of bits in the sample data signals. Each of the edge data signals may indicate a position of an edge in a corresponding one of the sample data signals. In this regard, an edge may correspond to a position at which the logic value of a bit in a sample data signal is changed.

In detail, the edge extraction circuit 222 may compare logic values of adjacent bits in sample data and generate a plurality of edge data signals. In an embodiment, when the logic value of an m-th (where "m" is a natural number) bit in a sample data signal differs from the logic value of an (m-1)-th bit in the sample data signal, the edge extraction circuit 222 may set the logic value of an m-th bit in edge data to the first value. Contrarily, when the logic value of the m-th bit in the sample data is the same as the logic value of the (m-1)-th bit in the sample data signal, the edge extraction circuit 222 may set the logic value of the m-th bit in the edge data to the second value. This is described in detail with reference to FIGS. 3 and 4 below.

Figure 3:
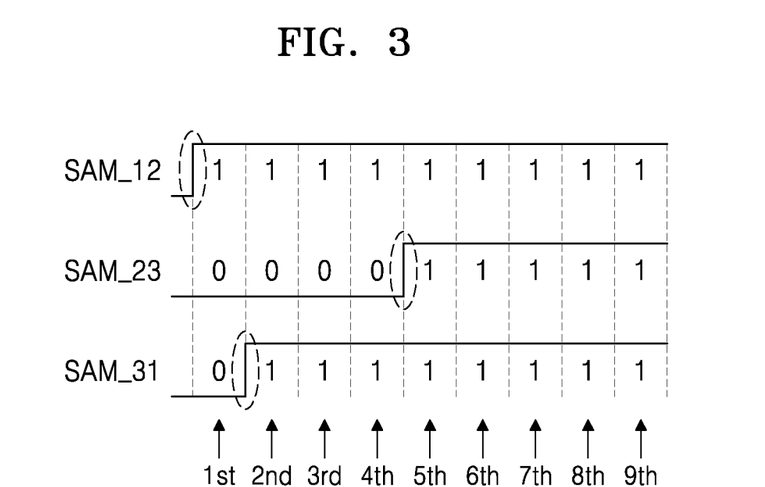
FIG. 3 is a diagram of an example of plurality of sample data signals generated by a test device, according to an embodiment.
Figure 4:
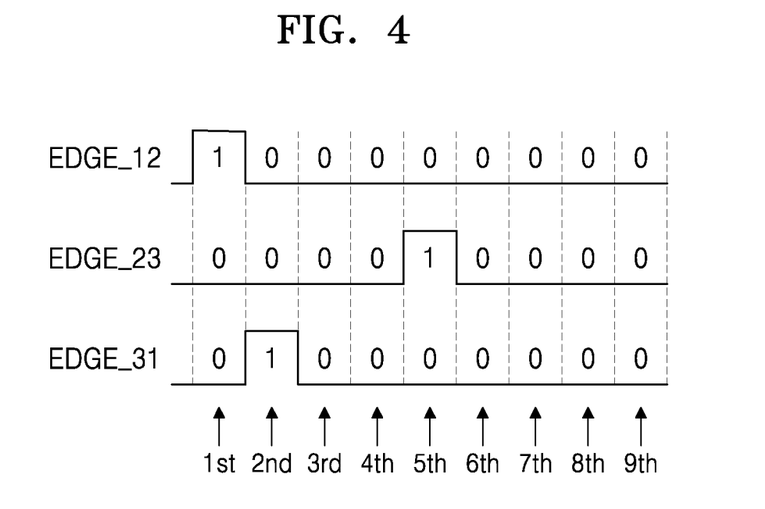
FIG. 4 is a diagram of an example of plurality of edge data signals generated by a test device, according to an embodiment.

FIG. 3 is a diagram of an example of plurality of sample data signals that may be generated by a test device or a receiver, according to an embodiment. FIG. 4 is a diagram of an example of edge data signals generated by a test device, according to an embodiment.

FIG. 3 shows examples of data streams, designated first to third sample data SAM_12, SAM_23, and SAM_31, which result from sampling by the sampling circuit 221 of the first to third comparison signals COM_12, COM_23, and COM_31, respectively.

In the example of FIG. 3, all of the first to ninth bits in the first sample data SAM_12 are 1's. An edge of the first sample data SAM_12 may be a leading edge of the first bit in the data stream.

In the example of FIG. 3, the first to fourth bits in the second sample data SAM_23 are all 0's, and the fifth to ninth bits in SAM_23 are all 1's. Thus, an edge of the second sample data SAM_23 is between the fourth and fifth bits.

In the example of FIG. 3, only the first bit in the third sample data SAM_31 is "0" and the second to ninth bits are each "1". Thus, an edge of the third sample data SAM_31 is between the first and second bits.

FIG. 4 shows examples of first to third edge data EDGE_12, EDGE_23, and EDGE_31 generated by the edge extraction circuit 222, based on the first to third sample data SAM_12, SAM_23, and SAM_31, respectively. Referring to FIGS. 3 and 4, all of the first to ninth bits in the first sample data SAM_12 are 1's. It is noted that in FIG. 3, a bit just before the first bit in SAM_12 (a zeroth bit, of which a portion is shown) is "0".

In the example, because the first and zeroth bits in SAM_12 have different logic values, the edge extraction circuit 222 may set the logic value of the first bit in the first edge data EDGE_12 to "1" as illustrated. Because the first to ninth bits in the first sample data SAM_12 have the same logic value, the edge extraction circuit 222 may set the logic values of the second to ninth bits in the first edge data EDGE_12 to "0". As noted earlier, in an alternative example, 1's and 0's are interchanged in the edge data signals of FIG. 4.

The first to fourth bits in the second sample data SAM_23 may have the second value, and the fifth to ninth bits in the second sample data SAM_23 may have the first value.

Although only partially shown in FIG. 3, a bit (i.e., a zeroth bit) before the first bit in the second sample data SAM_23 may have the second value.

Because the fifth and fourth bits in the second sample data SAM_23 have different logic values from each other, the edge extraction circuit 222 may set the logic value of the fifth bit in the second edge data EDGE_23 to the first value. Because the zeroth to fourth bits in the second sample data SAM_23 have the same logic value, the edge extraction circuit 222 may set the logic values of the first to fourth bits in the second edge data EDGE_23 to the second value. Because the fifth to ninth bits in the second sample data SAM_23 have the same logic value, the edge extraction circuit 222 may set the logic values of the sixth to ninth bits in the second edge data EDGE_23 to the second value.

The first bit in the third sample data SAM_31 may have the second value, and the second to ninth bits in the third sample data SAM_31 may have the first value. Although only partially shown in FIG. 3, a bit (i.e., a zeroth bit) before the first bit in the third sample data SAM_31 may have the second value.

Because the second and first bits in the third sample data SAM_31 have different logic values, the edge extraction circuit 222 may set the logic value of the second bit in the third edge data EDGE_31 to the first value. Because the zeroth and first bits in the third sample data SAM_31 have the same logic value, the edge extraction circuit 222 may set the logic value of the first bit in the third edge data EDGE_31 to the second value. Because the second to ninth bits in the third sample data SAM_31 have the same logic value, the edge extraction circuit 222 may set the logic values of the third to ninth bits in the third edge data EDGE_31 to the second value.

Returning to FIG. 2, the edge combining circuit 223 may generate combined edge data by performing a logic operation on the first to third edge data EDGE_12, EDGE_23, and EDGE_31. The edge combining circuit 223 may generate the combined edge data by performing an OR operation on the first to third edge data EDGE_12, EDGE_23, and EDGE_31. This is described in detail with reference to FIG. 5.

Figure 5:
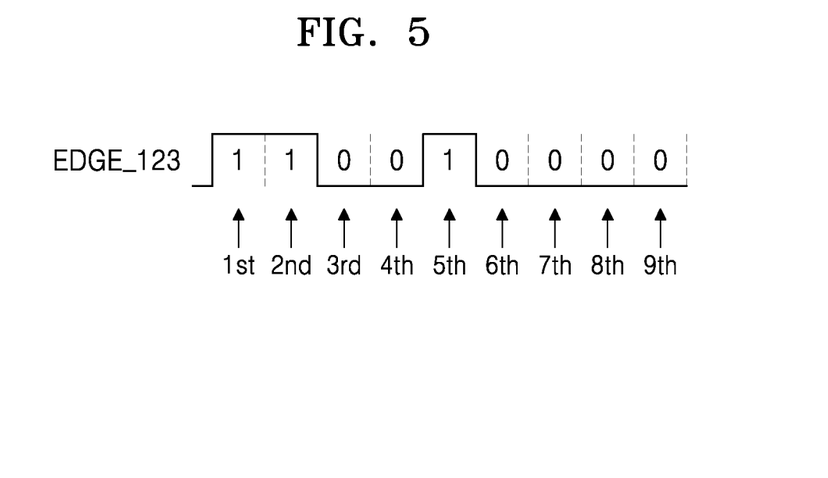
FIG. 5 is a diagram of an example of combined edge data generated by a test device, according to an embodiment.

FIG. 5 is a diagram of an example of combined edge data generated by a test device, according to an embodiment.

FIG. 5 shows an example of combined edge data EDGE_123 generated by the edge combining circuit 223. The combined edge data EDGE_123 of FIG. 5 may be generated based on the first to third edge data EDGE_12, EDGE_23, and EDGE_31 of FIG. 4.

Referring to FIGS. 4 and 5, the edge combining circuit 223 may generate the combined edge data EDGE_123 by performing an OR operation on bits in the same position in the first to third edge data EDGE_12, EDGE_23, and EDGE_31.

For example, the edge combining circuit 223 may generate a first bit in the combined edge data EDGE_123 by performing an OR operation on the first bit in the first edge data EDGE_12, the first bit in the second edge data EDGE_23, and the first bit in the third edge data EDGE_31. Here, because the first bit in the first edge data EDGE_12 has the first value (logic 1), the first bit in the combined edge data EDGE_123 may be calculated as the first value (logic 1).

In a similar manner, the edge combining circuit 223 may generate second to ninth bits in the combined edge data EDGE_123 by performing an OR operation on the second to ninth bits in the first to third edge data EDGE_12, EDGE_23, and EDGE_31.

Returning to FIG. 2, the filter circuit 224 may recover clock data by filtering the combined edge data EDGE_123. The filter circuit 224 may filter the combined edge data EDGE_123 using a preset look-up table.

In detail, the filter circuit 224 may apply the look-up table to "k" consecutive bits (where "k" is a natural number) at a time in the combined edge data EDGE_123 when filtering the combined edge data EDGE_123, thereby generating a plurality of sequences of temporary clock data.

For example, when k=5, the filter circuit 224 may apply the look-up table to the first to fifth bits in the combined edge data EDGE_123 and generate temporary clock data. The filter circuit 224 may apply the look-up table to the second to sixth bits in the combined edge data EDGE_123 and generate temporary clock data. The filter circuit 224 may apply the look-up table to the third to seventh bits in the combined edge data EDGE_123 and generate temporary clock data. In this manner, the look-up table may be applied to the combined edge data EDGE_123.

Thereafter, the filter circuit 224 may recover clock data by performing an OR operation on the corresponding bits within the sequences of temporary clock data.

The method by which the filter circuit 224 recovers clock data is described in detail with reference to FIGS. 6 and 7.

Figure 6:
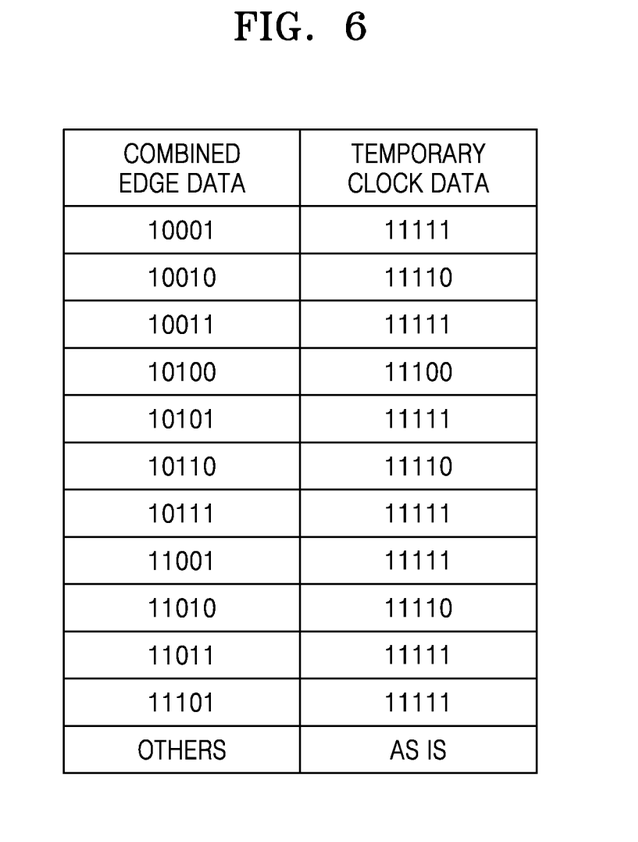
FIG. 6 is a diagram of an example of a look-up table used by a filter circuit of a test device, according to an embodiment.

FIG. 6 is a diagram of an example of a look-up table used by a filter circuit of a test device, according to an embodiment. FIG. 7 is a diagram of an example of clock data recovered by a test device, according to an embodiment.

FIG. 6 shows an example of a look-up table used by the filter circuit 224. The look-up table of FIG. 6 may be used by the filter circuit 224 when k=5.

The combined edge data EDGE_123 is stored in the left column of the look-up table, and temporary clock data is stored in the right column of the look-up table. The filter circuit 224 may set temporary clock data by applying the look-up table to the combined edge data EDGE_123.

For example, when the combined edge data EDGE_123 is 10010, the filter circuit 224 may set temporary clock data to 11110 because temporary clock data in a row, in which the combined edge data EDGE_123 is 10010 in the look-up table, is 11110.

When the combined edge data EDGE_123 is 00010, the filter circuit 224 may set temporary clock data to 00010 that is the same as the combined edge data EDGE_123, based on the last row in the look-up table, because there is no row in which the combined edge data EDGE_123 is 00010 in the look-up table.

Figure 7:
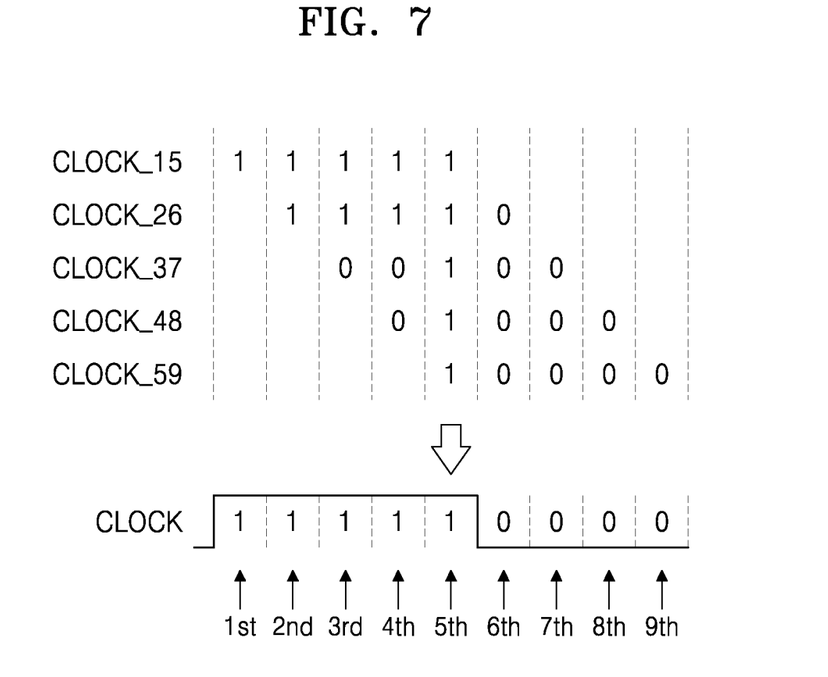
FIG. 7 is a diagram of an example of clock data recovered by a test device, according to an embodiment.

FIG. 7 shows examples of a plurality of sequences of temporary clock data, e.g., first to fifth temporary clock data CLOCK_15, CLOCK_26, CLOCK_37, CLOCK_48, and CLOCK_59, which are generated by the filter circuit 224 using the look-up table, and an example of clock data CLOCK recovered by the test device. The clock data CLOCK may be generated based on the combined edge data EDGE_123 of FIG. 5.

The filter circuit 224 may apply the look-up table to the first to fifth bits in the combined edge data EDGE_123. Because the first to fifth bits in the combined edge data EDGE_123 are 11001, the filter circuit 224 may set the first temporary clock data CLOCK_15 to 11111.

The filter circuit 224 may apply the look-up table to the second to sixth bits in the combined edge data EDGE_123. Because the second to sixth bits in the combined edge data EDGE_123 are 10010, the filter circuit 224 may set the second temporary clock data CLOCK_26 to 11110.

The filter circuit 224 may apply the look-up table to the third to seventh bits in the combined edge data EDGE_123.

Because the third to seventh bits in the combined edge data EDGE_123 are 00100, the filter circuit 224 may set the third temporary clock data CLOCK_37 to 00100.

The filter circuit 224 may apply the look-up table to the fourth to eighth bits in the combined edge data EDGE_123. Because the fourth to eighth bits in the combined edge data EDGE_123 are 01000, the filter circuit 224 may set the fourth temporary clock data CLOCK_48 to 01000.

The filter circuit 224 may apply the look-up table to the fifth to ninth bits in the combined edge data EDGE_123. Because the fifth to ninth bits in the combined edge data EDGE_123 are 10000, the filter circuit 224 may set the fifth temporary clock data CLOCK_59 to 10000.

Here, the filter circuit 224 may simultaneously perform the operations of applying the look-up table to "k" consecutive bits at a time. In other words, the filter circuit 224 may simultaneously perform an operation of applying the look-up table to the first to fifth bits in the combined edge data EDGE_123 and an operation of applying the look-up table to the fifth to ninth bits in the combined edge data EDGE_123.

Thereafter, the filter circuit 224 may recover the clock data CLOCK by performing an OR operation on the first to fifth temporary clock data CLOCK_15, CLOCK_26, CLOCK_37, CLOCK_48, and CLOCK_59. The filter circuit 224 may recover the clock data CLOCK by performing an OR operation on bits in results, i.e., the same position in the first to fifth temporary clock data CLOCK_15, CLOCK_26, CLOCK_37, CLOCK_48, and CLOCK_59, obtained by applying the look-up table.

For example, the filter circuit 224 may recover a third bit in the clock data CLOCK by performing an OR operation on a third bit in the first temporary clock data CLOCK_15, a second bit in the second temporary clock data CLOCK_26, and a first bit in the third temporary clock data CLOCK_37. Through this process, the filter circuit 224 may recover the clock data CLOCK as 111110000.

Returning to FIG. 2, the test device 200 may recover clock data using the sampling circuit 221, the edge extraction circuit 222, the edge combining circuit 223, and the filter circuit 224 of the FPGA 220. Accordingly, it is unnecessary to implement a separate circuit, which recovers clock data using a conventional technique (e.g., using commercially available parts), and therefore, the test device 200 may occupy a small area and recover clock data while consuming less power.

Figure 8:
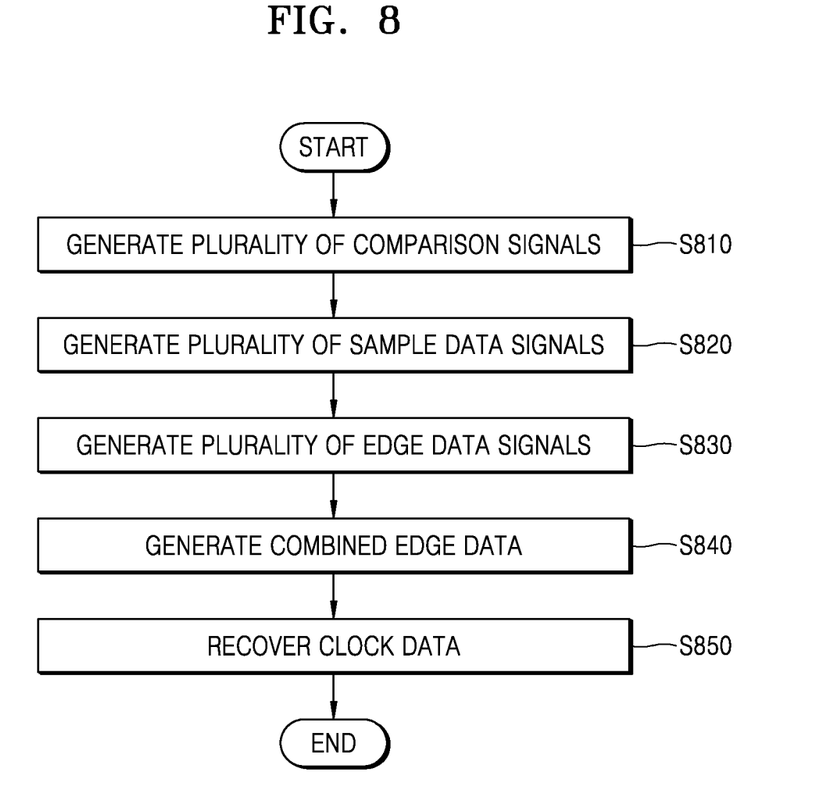
FIG. 8 is a flowchart of an operating method of a test device, according to an embodiment.

FIG. 8 is a flowchart of an operating method of a test device, according to an embodiment.

Referring to FIG. 8, the test device 200 may generate a plurality of comparison signals using the comparison circuit 210 in operation S810.

The test device 200 may input a combination of two of the input signals to each of the first to third comparators C1, C2, and C3 of the comparison circuit 210. The comparison circuit 210 may compare the two input signals with each other using each of the first to third comparators C1, C2, and C3 and generate a plurality of comparison signals.

The test device 200 may generate a plurality of sample data signals using the sampling circuit 221 of the FPGA 220 in operation S820.

The sampling circuit 221 may generate the sample data signals by sampling the comparison signals. To this end, the sampling circuit 221 may perform sampling at a higher speed than the communication between the semiconductor device 100 and the test device 200.

The test device 200 may generate a plurality of edge data signals using the edge extraction circuit 222 of the FPGA 220 in operation S830.

The edge extraction circuit 222 may compare logic values of adjacent bits in each of the sample data signals. The edge extraction circuit 222 may compare the logic values of the m-th bit and the (m-1)-th bit in a piece of sample data with each other.

The edge extraction circuit 222 may generate the edge data signals, based on comparison results.

In an embodiment, when the logic values of the m-th bit and the (m-1)-th bit in a sample data signal differ, the edge extraction circuit 222 may set the logic value of the m-th bit in a piece of edge data to the first value. Contrarily, when the logic values of the m-th bit and the (m-1)-th bit in the piece of sample data are the same, the edge extraction circuit 222 may set the logic value of the m-th bit in the piece of edge data to the second value.

The test device 200 may generate combined edge data using the edge combining circuit 223 of the FPGA 220 in operation S840.

The edge combining circuit 223 may generate the combined edge data by performing a logic operation on the edge data signals. To this end, the edge combining circuit 223 may generate the combined edge data by performing an OR operation on the edge data signals (stated more precisely, performing an OR operation on corresponding bits of the edge data signals). In other embodiments, alternative logic operations (e.g., AND, NAND or NOR operations or combinations thereof) may be substituted.

The test device 200 may recover clock data using the filter circuit 224 of the FPGA 220 in operation S850.

The filter circuit 224 may generate temporary clock data by filtering the combined edge data using a look-up table. To this end, the filter circuit 224 may apply the look-up table to "k" consecutive bits at a time in the combined edge data when filtering the combined edge data, thereby generating the temporary clock data.

Thereafter, the filter circuit 224 may perform a logic operation on the temporary clock data, thereby recovering the clock data. For instance, the filter circuit 224 may recover the clock data by performing an OR operation on the temporary clock data.

Figure 9:
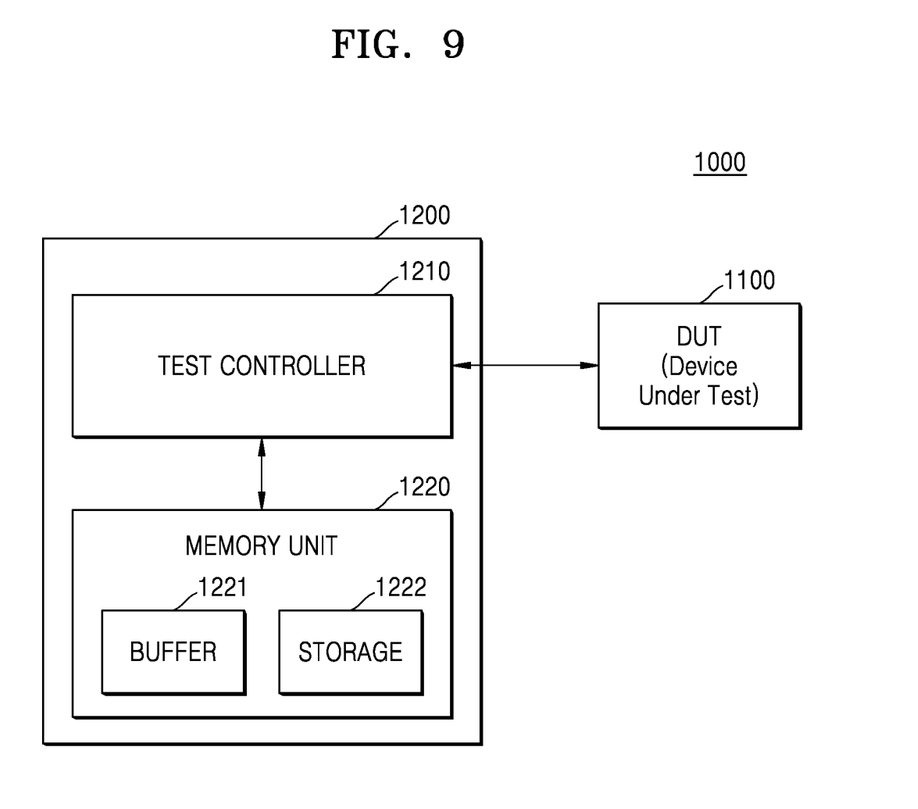
FIG. 9 is a diagram of a system according to an embodiment.

FIG. 9 is a diagram of a system 1000 according to an embodiment.

Referring to FIG. 9, the system 1000 may include a semiconductor device, i.e., a device under test (DUT) 1100, and a test device 1200 testing the DUT 1100. The test device 1200 may include a test controller 1210 and a memory unit 1220. In some embodiments, at least a part of the memory unit 1220 may be embedded in the test controller 1210.

In an embodiment, the test controller 1210 may include a comparison circuit and an FPGA. Some examples of the FPGA may include a Xilinx® FPGA, an Altera® FPGA, a Lattice Semiconductor® FPGA, a Microsemi® FPGA, an Achronix® FPGA, a QuickLogic® FPGA, an e2v® FPGA, or an Atmel® FPGA.

The test controller 1210 may process data or interpret and execute commands. For example, the test controller 1210 may recover clock data, based on a plurality of input signals.

In detail, the test controller 1210 may generate a plurality of comparison signals, based on the input signals. The test controller 1210 may generate a plurality of sample data signals, based on the comparison signals. The test controller 1210 may generate a plurality of edge data signals, based on the sample data signals. The test controller 1210 may generate combined edge data, based on the edge data signals. The test controller 1210 may recover clock data, based on the combined edge data.

The memory unit 1220 may store instructions, which are necessary for operations performed by the test controller 1210, or may store data read from the DUT 110 and the result of a test performed by the test controller 1210. The memory unit 1220 may include a buffer 1221 and a storage 1222. For example, the buffer 1221 may include volatile memory, and the storage 1222 may include non-volatile memory. In some embodiments, the buffer 1221 may include DRAM, and the storage 1222 may include flash memory, a solid state drive (SSD), or a hard disk drive (HDD).

The DUT 1100 may include a CIS, a system LSI, flash memory, DRAM, SRAM, EEPROM, PRAM, or MRAM.

According to an embodiment, the test device 1200 may recover clock data using an FPGA. Accordingly, compared to the case where a semiconductor device, such as an ASIC, customized for a particular use is used, the test device 1200 may recover clock data at low cost with a short development time. Compared to a circuit recovering clock data using conventional techniques, the test device 1200 may efficiently recover clock data while occupying a smaller area and consuming low power.

While the inventive concept has been particularly shown and described with reference to embodiments thereof, it will be understood that various changes in form and details may be made therein without departing from the spirit and scope of the following claims.

What is claimed is:

1. A test device for testing a semiconductor device, the test device comprising:
a comparison circuit configured to receive a plurality of input signals from the semiconductor device and generate a plurality of comparison signals based on the plurality of input signals, the input signals including symbol sequences that collectively represent at least clock data; and
a field programmable gate array (FPGA) configured to recover the clock data, based on the plurality of comparison signals,
wherein the FPGA includes:
a sampling circuit configured to generate a plurality of sample data signals by sampling the plurality of comparison signals, respectively;
an edge extraction circuit configured to generate a plurality of edge data signals, based on logic values of bits in the plurality of sample data signals;
an edge combining circuit configured to generate combined edge data by performing a logic operation on the plurality of edge data signals; and
a filter circuit configured to recover the clock data by filtering the combined edge data.

2. The test device of claim 1, wherein the comparison circuit includes a plurality of comparators each configured to compare two of the plurality of input signals with each other and generate one of the plurality of comparison signals based on the comparison.

3. The test device of claim 1, wherein the sampling circuit is further configured to generate the plurality of sample data signals by sampling the plurality of comparison signals at a speed that is higher than a communication speed of the plurality of input signals.

4. The test device of claim 1, wherein the edge extraction circuit is further configured to compare logic values of adjacent bits in each of the plurality of sample data signals and generate the plurality of edge data signals.

5. The test device of claim 4, wherein the edge extraction circuit is further configured to set a logic value of an m-th bit in each of the plurality of edge data signals to a first value when logic values of the m-th bit and an (m-1)-th bit in each of the plurality of edge data signals are different from each other, where "m" is a natural number, and
set the logic value of the m-th bit in each of the plurality of edge data signals to a second value when the logic values of the m-th bit and the (m-1)-th bit in each of the plurality of edge data signals are identical to each other.

6. The test device of claim 1, wherein the edge combining circuit is further configured to generate the combined edge data by performing an OR operation on the plurality of edge data signals.

7. The test device of claim 1, wherein the filter circuit is further configured to filter the combined edge data using a preset look-up table.

8. The test device of claim 7, wherein the filter circuit is further configured to generate a plurality of sequences of temporary clock data by applying the preset look-up table to "k" consecutive bits at a time in the combined edge data when filtering the combined edge data and recover the clock data by performing a logic operation on corresponding bits of the plurality of sequences of temporary clock data.

9. The test device of claim 8, wherein the filter circuit is configured to recover the clock data by performing an OR operation on the corresponding bits of the plurality of sequences of temporary clock data.

10. A test device comprising:
a comparison circuit configured to receive input signals from a semiconductor device and generate comparison signals based on the input signals, the input signals including symbol sequences that collectively represent clock data and a set of multi-bit data; and
clock recovery circuitry comprising:
a sampling circuit configured to generate sample data signals by sampling respective ones of the comparison signals;
an edge extraction circuit configured to generate edge data signals, based on logic values of bits in the sample data signals; and
a filter circuit configured to recover the clock data based on the edge data signals.

11. The test device of claim 10, wherein the clock recovery circuitry further comprising:
an edge combining circuit configured to generate combined edge data by performing a logic operation on the edge data signals.

12. The test device of claim 11, wherein the filter circuit is further configured to recover the clock data by filtering the combined edge data.

13. The test device of claim 10, wherein the comparison circuit includes a plurality of comparators each configured to compare two of the input signals with each other and generate one of the comparison signals based on the comparison.

14. The test device of claim 10, wherein the sampling circuit is further configured to generate the sample data signals by sampling the comparison signals at a speed that is higher than a communication speed of the input signals.

15. The test device of claim 10, wherein the edge extraction circuit is further configured to compare logic values of adjacent bits in each of the sample data signals and generate the edge data signals.

16. The test device of claim 10, wherein the filter circuit is further configured to filter the combined edge data using a preset look-up table.

17. A test device for testing a semiconductor device, the test device comprising:
- a comparison circuit configured to receive a plurality of input signals from the semiconductor device and generate a plurality of comparison signals based on the plurality of input signals;
- a sampling circuit configured to generate a plurality of sample data signals by sampling the plurality of comparison signals;
- an edge extraction circuit configured to generate a plurality of edge data signals, based on logic values of bits in the plurality of sample data signals;
- an edge combining circuit configured to generate combined edge data by performing a logic operation on the plurality of edge data signals; and
- a filter circuit configured to recover a clock data by filtering the combined edge data.

18. The test device of claim 17, wherein the sampling circuit, the edge extraction circuit, the edge combining circuit, and the filter circuit are implemented in a field programmable gate array (FPGA).

19. The test device of claim 18, wherein the plurality of comparison signals are output from the comparison circuit and directly input to the FPGA.

20. The test device of claim 17, wherein the sampling circuit generates the sample data signals by performing sampling at a higher speed than communication between the semiconductor device and the test device.

* * * * *